US011765682B2

(12) United States Patent
Farag et al.

(10) Patent No.: US 11,765,682 B2
(45) Date of Patent: Sep. 19, 2023

(54) METHOD AND APPARATUS FOR NR UE-BASED RELATIVE POSITIONING SCHEME

(71) Applicant: Samsung Electronics Co., Ltd., Suwon-si (KR)

(72) Inventors: Emad N. Farag, Flanders, NJ (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 17/161,237

(22) Filed: Jan. 28, 2021

(65) Prior Publication Data

US 2021/0243720 A1  Aug. 5, 2021

Related U.S. Application Data

(60) Provisional application No. 62/968,437, filed on Jan. 31, 2020.

(51) Int. Cl.
*H04W 64/00* (2009.01)
*H04B 7/08* (2006.01)
*H04W 56/00* (2009.01)

(52) U.S. Cl.
CPC .......... *H04W 64/006* (2013.01); *H04B 7/086* (2013.01); *H04W 56/009* (2013.01); *H04W 56/0045* (2013.01)

(58) Field of Classification Search
None
See application file for complete search history.

(56) References Cited

U.S. PATENT DOCUMENTS

| | | | |
|---|---|---|---|
| 9,713,117 B2 | 7/2017 | Khoryaev et al. | |
| 10,405,145 B2 | 9/2019 | Edge | |
| 2012/0244880 A1 | 9/2012 | Lee et al. | |
| 2014/0073352 A1 | 3/2014 | Aldana et al. | |
| 2017/0150330 A1 | 5/2017 | Kim et al. | |
| 2018/0262867 A1 | 9/2018 | Edge | |
| 2021/0058889 A1* | 2/2021 | Zhang | G01S 5/10 |
| 2021/0072340 A1* | 3/2021 | Wang | H04L 5/0051 |
| 2021/0227484 A1* | 7/2021 | Zarifi | H04W 72/0446 |
| 2022/0039080 A1* | 2/2022 | Khoryaev | H04W 4/40 |

OTHER PUBLICATIONS

"3rd Generation Partnership Project; Technical Specification Group Radio Access Network; NR; Physical channels and modulation (Release 16)", 3GPP TS 38.211 V16.4.0, Dec. 2020, 133 pages.

(Continued)

*Primary Examiner* — Gregory B Sefcheck

(57) ABSTRACT

A first UL or SL signal received by one UE from another UE is utilized to determine: a time of arrival for the first UL or SL signal relative to a reference time for the first UL or SL signal; a propagation time for the first UL or SL signal; a distance between the UE and the other UE determined based on at least the time of arrival for the first UL or SL signal, a first round trip time for transmissions between a base station and the other UE, and a second round trip time for transmissions between the base station and the UE; and an angle of arrival relative to a coordinate system of the UE for one of a second UL signal or a second SL signal from the other UE.

20 Claims, 6 Drawing Sheets

(56) References Cited

OTHER PUBLICATIONS

"3rd Generation Partnership Project; Technical Specification Group Radio Access Network; NR; Multiplexing and channel coding (Release 16)", 3GPP TS 38.212 V16.4.0, Dec. 2020, 152 pages.
"3rd Generation Partnership Project; Technical Specification Group Radio Access Network; NR; Physical layer procedures for control (Release 16)", 3GPP TS 38.213 V16.4.0, Dec. 2020, 181 pages.
"3rd Generation Partnership Project; Technical Specification Group Radio Access Network; NR; Physical layer procedures for data (Release 16)", 3GPP TS 38.214 V16.4.0, Dec. 2020, 169 pages.
"3rd Generation Partnership Project; Technical Specification Group Radio Access Network; NR; Medium Access Control (MAC) protocol specification (Release 16)", 3GPP TS 38.321 V16.3.0, Dec. 2020, 156 pages.
"3rd Generation Partnership Project; Technical Specification Group Radio Access Network; NR; Radio Resource Control (RRC) protocol specification (Release 16)", 3GPP TS 38.331 V16.3.1, Dec. 2020, 932 pages.
"3rd Generation Partnership Project; Technical Specification Group Services and System Aspects; Service requirements for the 5G system; Stage 1 (Release 17)", 3GPP TS 22.261 V17.1.0, Dec. 2019, 80 pages.
International Search Report and Written Opinion of the International Searching Authority in connection with International Application No. PCT/KR2021/001249 dated May 6, 2021, 8 pages.
Qualcomm Incorporated, "DL and UL NR Positioning Procedures" 3GPP TSG-RAN WG2 Meeting #107bis, R2-1913395 (Revision of R2-1909416) Chongqing, China, Oct. 14-18, 2019, 53 pages.
Qualcomm Incorporated, "DL Reference Signals for NR Positioning" 3GPP TSG RAN WG1 #98, R1-1909278, Prague, Czech Republic, Aug. 26-30, 2019, 20 pages.
Qualcomm Incorporated, "On UE-based positioning performance requirements" 3GPP TSG-RAN WG4 Meeting #92-Bis, R4-1912362, Chongqing, China, Oct. 10-14, 2019, 3 pages.
Nokia et al., "On the scope of RRM requirements for NR positioning" 3GPP TSG-RAN WG4 Meeting #92-Bis, R4-1912415, Chongqing, China, Oct. 14-18, 2019, 4 pages.
Partial European Search Report dated Jun. 16, 2023 regarding Application No. 21746992.3, 13 pages.

* cited by examiner

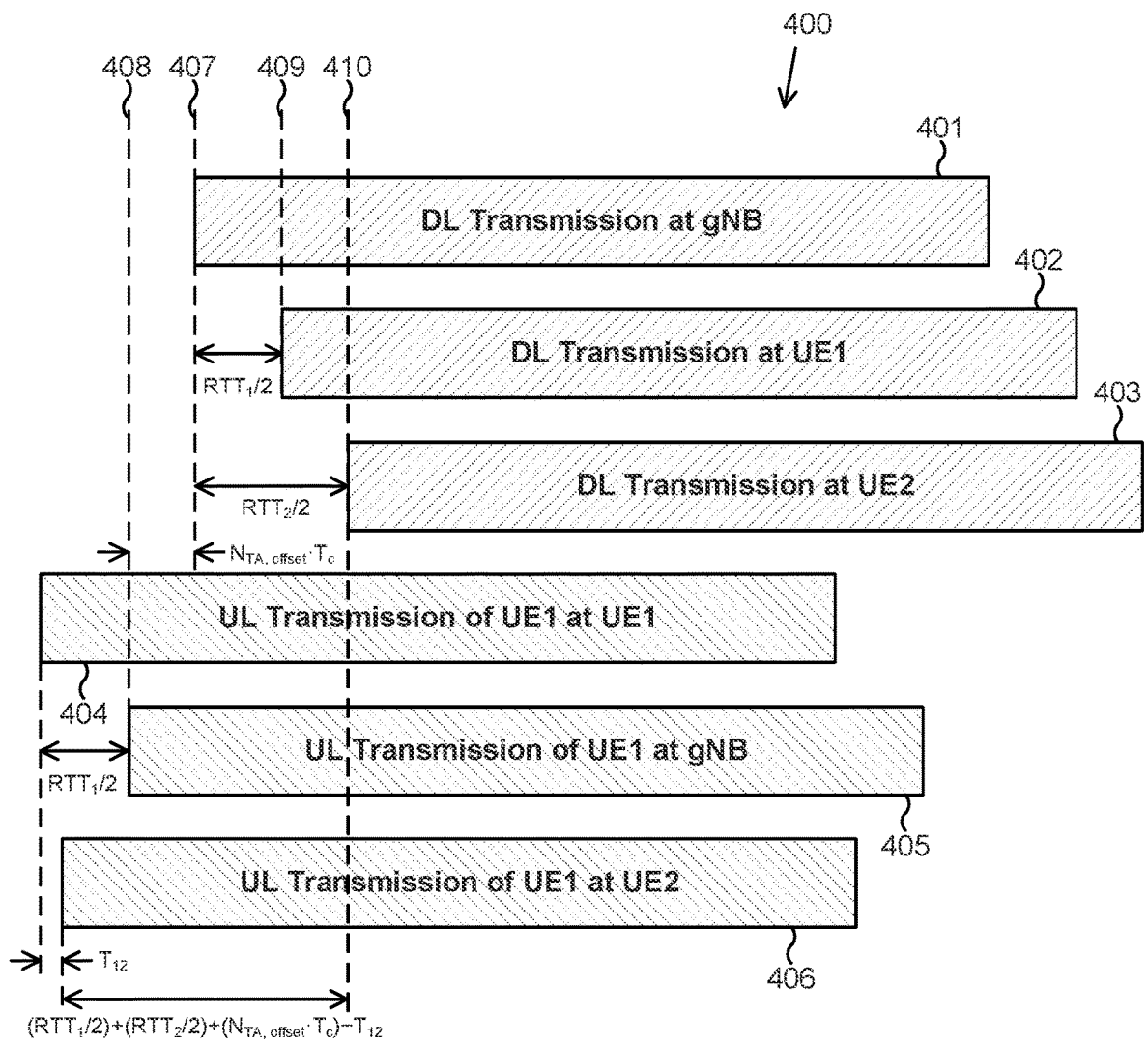
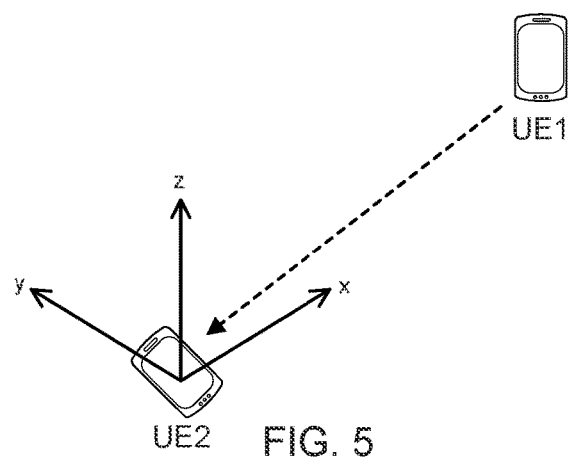
FIG. 4
FIG. 5

METHOD AND APPARATUS FOR NR UE-BASED RELATIVE POSITIONING SCHEME

CROSS-REFERENCE TO RELATED APPLICATION AND CLAIM OF PRIORITY

This application claims priority under 35 U.S.C. § 119(e) to U.S. Provisional Patent Application No. 62/968,437 filed Jan. 31, 2020. The above-identified patent document(s) are incorporated herein by reference.

TECHNICAL FIELD

The present disclosure relates generally to determining the relative position between terminals in wireless communication systems, and more specifically, to enabling a terminal to determine the relative position of another terminal based on the other terminal's uplink and/or sidelink transmission(s).

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large-scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP) communication, reception-end interference cancellation and the like.

The discussion of 5G systems and technologies associated therewith is for reference as certain embodiments of the present disclosure may be implemented in 5G systems, $6^{th}$ Generation (6G) systems, or even later releases which may use terahertz (THz) bands. However, the present disclosure is not limited to any particular class of systems or the frequency bands associated therewith, and embodiments of the present disclosure may be utilized in connection with any frequency band. For example, aspects of the present disclosure may also be applied to deployment of 5G communication systems, 6G communications systems, or communications using THz bands.

SUMMARY

Embodiments include a user equipment including a transceiver receiving one of a first uplink (UL) or sidelink (SL) signal from another UE and a processor operably connected to the transceiver. The processor determines: a time of arrival for the first UL or SL signal relative to a reference time for the first UL or SL signal; a propagation time for the first UL or SL signal; a distance between the UE and the other UE determined based on at least the time of arrival for the first UL or SL signal, a first round trip time for transmissions between a base station and the other UE, and a second round trip time for transmissions between the base station and the UE; and an angle of arrival relative to a coordinate system of the UE for one of a second UL signal or a second SL signal from the other UE.

The processor may determine the propagation time $T_p$ using $$T_p = \frac{RTT_1 + RTT_2}{2} + N_{TA,offset} \cdot T_c - T_{m21}$$

when the first UL or SL signal is a UL signal and the other UE advances the UL signal by $N_{TA,offset}$ to compensate for round trip propagation delay, or using $$T_p = \frac{RTT_2 - RTT_1}{2} - T_{m21}$$

otherwise, when the first UL or SL signal is the UL signal, and using $$T_p = T_{TA1} + \frac{RTT_2 - RTT_1}{2} - T_{m21},$$

when the first UL or SL signal is an SL signal and the other UE advances the SL signal by $T_{TA}$. The processor may determine the distance d using $$d = cT_p,$$

where
- $T_{m21}$ is the time of arrival for the first UL or SL signal relative to the reference time,
- $RTT_1$ is the first round trip time,
- $RTT_2$ is the second round trip time, and
- $N_{TA,offset}$ or $T_{TA1}$ is a timing advance for UL or SL transmissions, respectively, from the other UE relative to the reference time.

The processor may determine one of a position of the other UE relative to the UE, and a position of the other UE in a global coordinate system.

The first UL or SL signal may be an UL signal and the second UL or SL signal may be an UL signal, with one of the time of arrival of the first UL signal or the angle of arrival of the second UL signal determined from one of: a transmission by the other UE on a physical uplink shared channel (PUSCH) or physical uplink control channel (PUCCH); a transmission by the other UE of a sounding reference signal (SRS); or a transmission by the other UE on a physical random access channel (PRACH).

The first UL or SL signal may be an SL signal and the second UL or SL signal may be an SL signal, with one of the time of arrival for the first SL signal or the angle of arrival of the second SL signal is determined from one of: a transmission by the other UE on a physical sidelink shared channel (PSSCH) or physical sidelink control channel (PSCCH); a transmission by the other UE of a sidelink reference signal (RS); a transmission by the other UE of a sidelink synchronization signal/physical sidelink broadcast channel (PSBCH) block (S-SSB); or a transmission by the other UE on a physical sidelink feedback channel (PSFCH).

An absolute position of the other UE in a global coordinate system may be one of received from the base station, and determined using the position of the UE.

The position of the other UE may be determined by determining a distance between the UE and a third UE, and triangularization with at least the third UE.

The position of the other UE may further be determined by determining the distance between the UE and a fourth UE, and triangularization with the third and fourth UEs.

Embodiments including a base station include a processor configured to determine information including a first round trip time for transmissions between the BS and a first user equipment (UE), and a second round trip time for transmissions between the BS and a second UE, together with a transceiver coupled to the processor. The transceiver transmits the information to the second UE, and receives, from the second UE, a position of the first UE determined by the second UE by determining: a time of arrival for one of a first uplink (UL) signal or a first sidelink (SL) signal from the first UE relative to a reference time for the first UL or SL signal; a propagation time for the first UL or SL signal; a distance between the first and second UEs determined based on the time of arrival for the first UL or SL signal, a first round trip time for transmissions between a base station and the other UE, and a second round trip time for transmissions between the base station and the UE; and an angle of arrival relative to a coordinate system of the second UE of one of second UL signal or a second SL signal from the first UE.

The propagation time $T_p$ may be determined using $$T_p = \frac{RTT_1 + RTT_2}{2} + N_{TA,offset} \cdot T_c - T_{m21}$$

when the first UL or SL signal is a UL signal and the other UE advances the UL signal by $N_{TA,offset}$ to compensate for round trip propagation delay, using $$T_p = \frac{RTT_2 - RTT_1}{2} - T_{m21}$$

otherwise, when the first UL or SL signal is the UL signal, and using $$T_p = T_{TA1} + \frac{RTT_2 - RTT_1}{2} - T_{m21},$$

when the first UL or SL signal is an SL signal and the other UE advances the SL signal by $T_{TA}$. The distance d may be determined using $$d = cT_p,$$

where $T_{m21}$ is the time of arrival for the first UL or SL signal relative to the reference time, $RTT_1$ is the first round trip time, $RTT_2$ is the second round trip time, and $N_{TA,offset}$ or $T_{TA1}$ is a timing advance for UL or SL transmissions, respectively, from the other UE relative to the reference time.

The uplink or sidelink signal may be one of: a transmission by the first UE on a physical uplink shared channel (PUSCH) or physical uplink control channel (PUCCH); a transmission by the first UE of a sounding reference signal (SRS); a transmission by the first UE on a physical random access channel (PRACH); a transmission by the first UE on a physical sidelink shared channel (PSSCH) or physical sidelink control channel (PSCCH); a transmission by the first UE of a sidelink reference signal (RS); a transmission by the first UE of a sidelink synchronization signal/physical sidelink broadcast channel (PSBCH) block (S-SSB); or a transmission by the first UE on a physical sidelink feedback channel (PSFCH).

The BS may be provided the distance between the first UE and the second UE from the second UE, a distance between the first UE and the third UE from a third UE, and a distance between the first UE and the fourth UE from a fourth UE. The BS may be provided or determine a position of the second UE in a co-ordinate system, a position of the third UE in the co-ordinate system, and a position of the fourth UE in the co-ordinate system. The BS may determine a position of the first UE in the coordinate system by triangularization.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates a timing diagram in a cell for uplink transmission from a UE according to an embodiment of this disclosure;

FIG. 5 illustrates a relative position of a first UE relative to a second UE;

DETAILED DESCRIPTION

Figure 1:
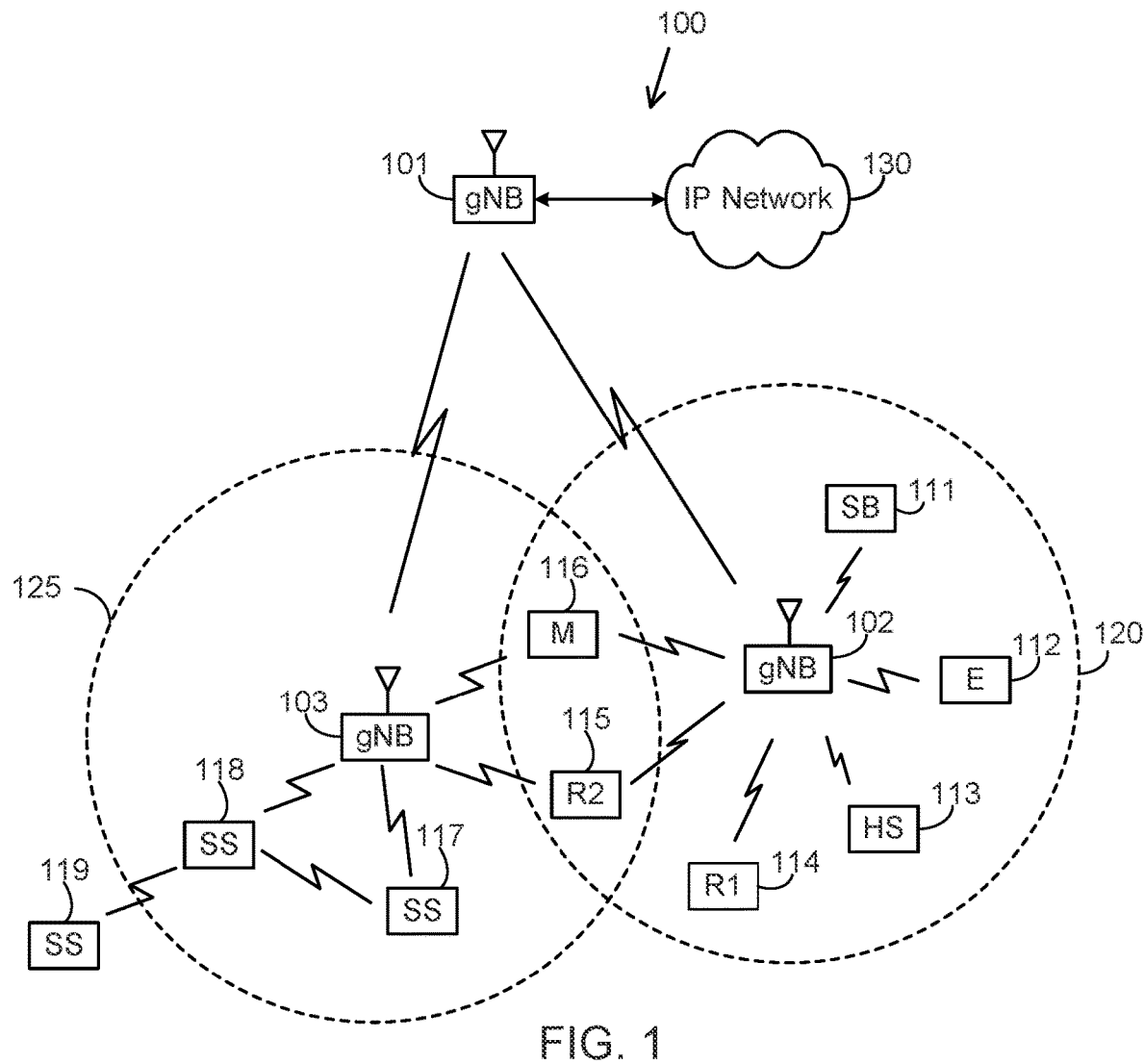
FIG. 1 illustrates an exemplary wireless network according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

REFERENCES

[1] 3GPP TS 38.211 v16.4.0, "NR; Physical channels and modulation."
[2] 3GPP TS 38.212 v16.4.0, "NR; Multiplexing and Channel coding."
[3] 3GPP TS 38.213 v16.4.0, "NR; Physical Layer Procedures for Control."
[4] 3GPP TS 38.214 v16.4.0, "NR; Physical Layer Procedures for Data."
[5] 3GPP TS 38.321 v16.3.0, "NR; Medium Access Control (MAC) protocol specification."
[6] 3GPP TS 38.331 v16.3.0, "NR; Radio Resource Control (RRC) Protocol Specification."
[7] 3GPP TS 22.261 v17.1.0, "Service requirements for the 5G system."

The above-identified references are incorporated herein by reference.

ABBREVIATIONS

ACK Acknowledgement
AoA Angle of Arrival
AoD Angle of Departure
BW Bandwidth
BWP Bandwidth Part
CORESET Control Resource Set
C-RNTI Cell Radio Network Temporary Identifier (RNTI)
CSI Channel State Information
CSI-RS Channel State Information Reference Signal
DCI Downlink Control Information
DL Downlink
DMRS Demodulation Reference Signal
FDD Frequency Division Duplexing
gNB Base Station
HARQ Hybrid Automatic Repeat Request (ARQ)
IMU Inertial Measurement Unit
MCS Modulation and Coding Scheme
NR New Radio
PBCH Primary Broadcast Channel
PCell Primary Cell
PDCCH Physical Downlink Control Channel
PDSCH Physical Downlink Shared Channel
PSBCH Physical Sidelink Broadcast Channel
PSCCH Physical Sidelink Control Channel
PSFCH Physical Sidelink Feedback Channel
PSSCH Physical Sidelink Shared Channel
PUCCH Physical Uplink Control Channel
PUSCH Physical Uplink Shared Channel
RAT Radio Access Technology
RB Resource Block
RNTI Radio Network Temporary Identifier
RS Reference Signal
RSU Road Side Unit
SC Sub-carrier
SCell Secondary Cell
SCI Sidelink Control Information
SFCI Sidelink Feedback Control Information
SINR Signal to Interference and Noise Ratio
SL Sidelink
SRS Sounding Reference Signal
SS Synchronization Signals
S-SSB SL Synchronization Signal/PSBCH Block
TB Transport Block
TBS Terrestrial Beacon System
TDD Time Division Duplexing
TPC Transmit Power Control
UCI Uplink Control Information
UE User Equipment
UL Uplink The present disclosure relates to a 5G/NR communication system.

The present disclosure relates to determining the relative position between UEs. According to SA requirements in [7], the requirement for horizontal positioning accuracy and that for vertical positioning accuracy is 0.2 meters (m).

The present disclosure relates to enabling a UE to determine the relative position of another UE based on the other UE's uplink transmission.

The present disclosure relates to enabling a UE to determine the relative position of another UE based on the other UE's sidelink transmission.

Aspects, features, and advantages of the disclosure are readily apparent from the following detailed description, simply by illustrating a number of particular embodiments and implementations. The disclosed subject matter is also capable of other and different embodiments, and several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The following examples for the embodiments of the present disclosure are for illustrative purposes and do not limit the scope or applicability of the disclosure.

In the following, for brevity, both FDD and TDD are considered as the duplex method for both DL and UL signaling. Sidelink signaling is also considered Although exemplary descriptions and embodiments to follow assume orthogonal frequency division multiplexing (OFDM) or orthogonal frequency division multiple access (OFDMA), this invention can be extended to other OFDM-based transmission waveforms or multiple access schemes such as filtered OFDM (F-OFDM).

This disclosure of invention covers several components which can be used in conjunction or in combination with one another, or can operate as standalone schemes.

FIG. 1 illustrates an exemplary wireless network 100 according to various embodiments of this disclosure. The embodiment of the wireless network 100 shown in FIG. 1 is for illustration only. Other embodiments of the wireless network 100 can be used without departing from the scope of this disclosure.

The wireless network 100 includes an gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a proprietary IP network, or other data network.

Depending on the network type, other well-known terms may be used instead of "gNodeB" or "gNB," such as "base station" or "access point." For the sake of convenience, the terms "gNodeB" and "gNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine). The UE may also be a car, a truck, a van, a drone, or any similar machine or a device in such machines.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115, the UE 116, UE 117 and UE 118. In some embodiments, one or more of the gNBs 101-103 may communicate with each other and with the UEs 111-118 using 5G, Long Term Evolution (LTE), LTE Advanced (LTE-A), Worldwide Interoperability for Microwave Access (WiMAX), or other advanced wireless communication techniques. In some embodiments, multiple UEs, e.g., UE 117, UE 118 and UE 119 may communicate directly with each other through device-to-device (D2D) communication. In some embodiments, a UE, e.g., UE 119, is outside the coverage area of the network, but can communicate with other UEs inside the coverage area of the network, e.g., UE 118, or outside the coverage area of the network.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include 2D antenna arrays as described in embodiments of the present disclosure. In some embodiments, one or more of gNB 101, gNB 102 and gNB 103 support the codebook design and structure for systems having 2D antenna arrays.

Although FIG. 1 illustrates one example of a wireless network 100, various changes may be made to FIG. 1. For example, the wireless network 100 can include any number of gNBs and any number of UEs in any suitable arrangement. Also, the gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as external telephone networks or other types of data networks. Furthermore, any number of UEs can communicate directly with each other using D2D communications, such UEs can be within network coverage of the same or different gNBs, outside of network coverage, or partially within network coverage where some UEs are within network coverage, while others are outside of network coverage.

Figure 2A:
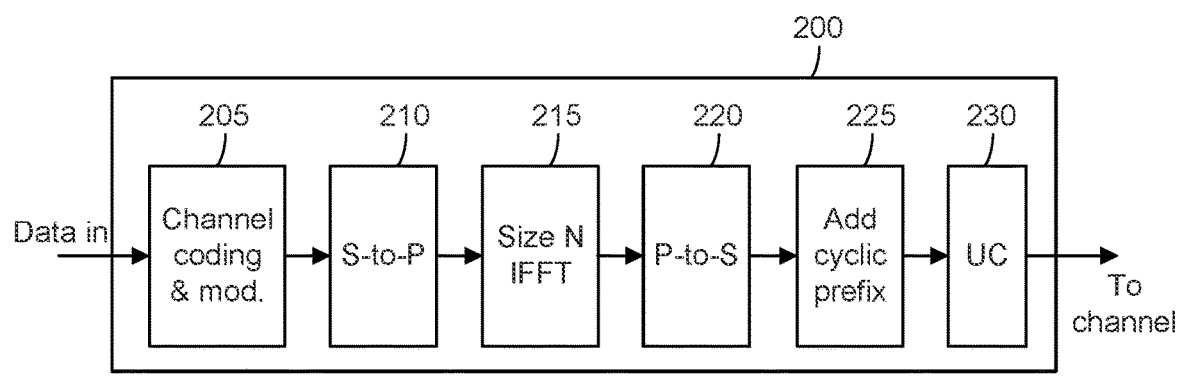
FIGS. 2A and 2B illustrate exemplary wireless transmit and receive paths according to various embodiments of this disclosure.
Figure 2B:
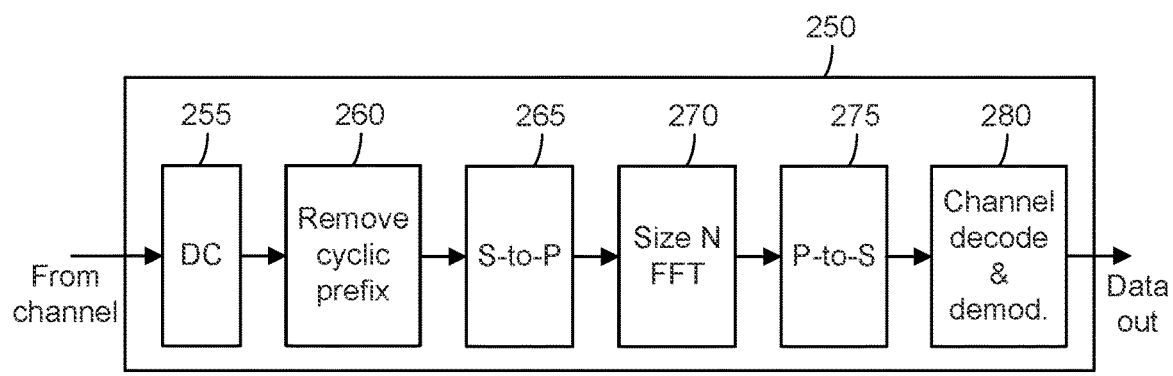

FIGS. 2A and 2B illustrate exemplary wireless transmit and receive paths according to various embodiments of this disclosure. In the following description, a transmit path 200 may be described as being implemented in a gNB (such as gNB 102), while a receive path 250 may be described as being implemented in a UE (such as UE 116). However, it will be understood that the receive path 250 can be implemented in a gNB and that the transmit path 200 can be implemented in a UE. Furthermore, it will be understood that the receive path 250 can be implemented in one UE, and that the transmit path 200 can be implemented in another UE in case of device-2-device communication. In some embodiments, the receive path 250 is configured to support the codebook design and structure for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to a radio frequency (RF) frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the gNBs 101-103 may implement a transmit path 200 that is analogous to transmitting in the downlink to UEs 111-116 and may implement a receive path 250 that is analogous to receiving in the uplink from UEs 111-118. Similarly, each of UEs 111-118 may implement a transmit path 200 for transmitting in the uplink to gNBs 101-103 and may implement a receive path 250 for receiving in the downlink from gNBs 101-103. Furthermore, each of UEs 111-119 may implement a transmit path 200 for transmitting in the sidelink to another one of UEs 111-119 and may implement a receive path 250 for receiving in the sidelink from another one of UEs 111-119.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B can be combined, further subdivided, or omitted and additional components can be added according to particular needs. Also, FIGS. 2A and 2B are meant to illustrate examples of the types of transmit and receive paths that can be used in a wireless network. Any other suitable architectures can be used to support wireless communications in a wireless network.

Figure 3A:
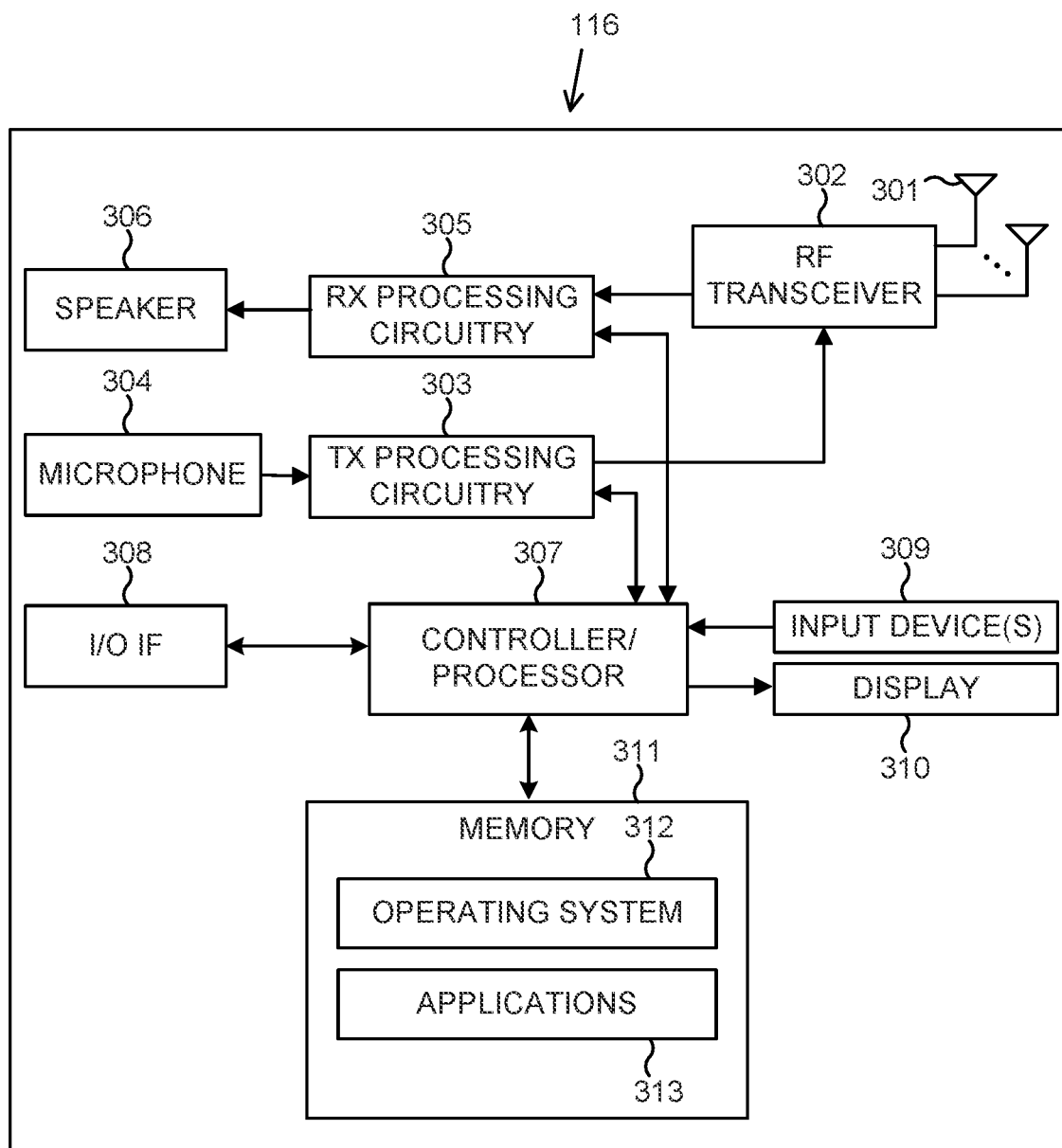
FIG. 3A illustrates an example UE according to an embodiment of this disclosure.

FIG. 3A illustrates an example UE 116 according to an embodiment of this disclosure. The embodiment of the UE 116 illustrated in FIG. 3A is for illustration only, and the UEs 111-115, 117-119 of FIG. 1 can have the same or similar configuration. However, UEs come in a wide variety of configurations, and FIG. 3A does not limit the scope of this disclosure to any particular implementation of a UE.

The UE 116 includes an antenna 301, a radio frequency (RF) transceiver 302, transmit (TX) processing circuitry 303, a microphone 304, and receive (RX) processing circuitry 305. The UE 116 also includes a speaker 306, a main processor (or controller) 307, an input/output (I/O) interface (IF) 308, a keypad and/or other input devices 309, a display 310, and a memory 311. The memory 311 includes an operating system (OS) program 312 and one or more applications 313.

The RF transceiver 302 receives, from the antenna 301, an incoming RF signal transmitted by an gNB of the network 100, or transmitted by another UE. The RF transceiver 302 down-converts the incoming RF signal to generate an intermediate frequency (IF) or baseband signal. The IF or baseband signal is sent to the RX processing circuitry 305, which generates a processed baseband signal by filtering, decoding, and/or digitizing the baseband or IF signal. The RX processing circuitry 305 transmits the processed baseband signal to the speaker 306 (such as for voice data) or to the main processor 307 for further processing (such as for web browsing data).

The TX processing circuitry 303 receives analog or digital voice data from the microphone 304 or other outgoing baseband data (such as web data, e-mail, or interactive video game data) from the main processor 307. The TX processing circuitry 303 encodes, multiplexes, and/or digitizes the outgoing baseband data to generate a processed baseband or IF signal. The RF transceiver 302 receives the outgoing processed baseband or IF signal from the TX processing circuitry 303 and up-converts the baseband or IF signal to an RF signal that is transmitted via the antenna 301.

The main processor 307 can include one or more processors or other processing devices and execute the basic OS program 312 stored in the memory 311 in order to control the overall operation of the UE 116. For example, the main processor 307 can control the reception of forward channel signals and the transmission of reverse channel signals, and/or the transmission and the reception of sidelink channel signals by the RF transceiver 302, the RX processing circuitry 305, and the TX processing circuitry 303 in accordance with well-known principles. In some embodiments, the main processor 307 includes at least one microprocessor or microcontroller.

The main processor 307 is also capable of executing other processes and programs resident in the memory 311, such as operations for channel quality measurement, timing measurements and reporting for systems having 2D antenna arrays as described in embodiments of the present disclosure as described in embodiments of the present disclosure. The main processor 307 can move data into or out of the memory 311 as required by an executing process. In some embodiments, the main processor 307 is configured to execute the applications 313 based on the OS program 312 or in response to signals received from gNBs or an operator. The main processor 307 is also coupled to the I/O interface 308, which provides the UE 116 with the ability to connect to other devices such as laptop computers and handheld computers as well as sensors, cameras, actuators and other devices inside an automobile. The I/O interface 308 is the communication path between these accessories and the main controller 307.

The main processor 307 is also coupled to the keypad 309 and the display unit 310. The operator of the UE 116 can use the keypad 309 to enter data into the UE 116. The display 310 may be a liquid crystal display or other display capable of rendering text and/or at least limited graphics, such as from web sites. The memory 311 is coupled to the main processor 307. Part of the memory 311 can include a random access memory (RAM), and another part of the memory 311 can include a Flash memory or other read-only memory (ROM).

Although FIG. 3A illustrates one example of UE 116, various changes may be made to FIG. 3A. For example, various components in FIG. 3A can be combined, further subdivided, or omitted and additional components can be added according to particular needs. As a particular example, the main processor 307 can be divided into multiple processors, such as one or more central processing units (CPUs) and one or more graphics processing units (GPUs). Also, while FIG. 3A illustrates the UE 116 configured as a mobile telephone or smartphone, UEs can be configured to operate as other types of mobile or stationary devices.

Figure 3B:
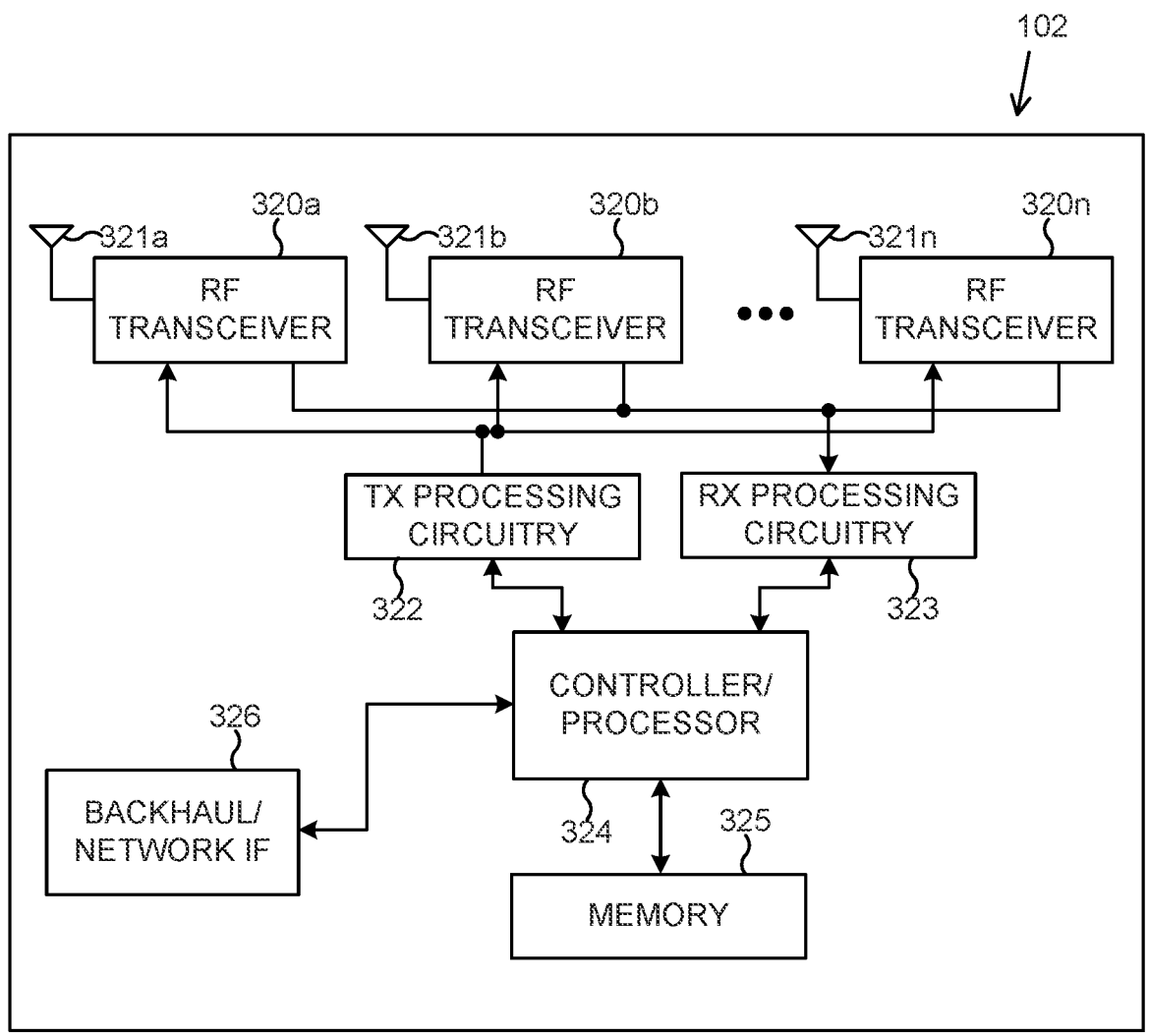
FIG. 3B illustrates an example gNB according to an embodiment of this disclosure.

FIG. 3B illustrates an example gNB 102 according to an embodiment of this disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of this disclosure to any particular implementation of an gNB. It is noted that gNB 101 and gNB 103 can include the same or similar structure as gNB 102.

As shown in FIG. 3B, the gNB 102 includes multiple antennas 320a-320n, multiple RF transceivers 321a-321n, transmit (TX) processing circuitry 322, and receive (RX) processing circuitry 323. In certain embodiments, one or more of the multiple antennas 320a-320n include 2D antenna arrays. The gNB 102 also includes a controller/processor 324, a memory 325, and a backhaul or network interface 326.

The RF transceivers 321a-321n receive, from the antennas 320a-320n, incoming RF signals, such as signals transmitted by UEs or other gNBs. The RF transceivers 321a-321n down-convert the incoming RF signals to generate IF or baseband signals. The IF or baseband signals are sent to the RX processing circuitry 323, which generates processed baseband signals by filtering, decoding, and/or digitizing the baseband or IF signals. The RX processing circuitry 323 transmits the processed baseband signals to the controller/processor 324 for further processing.

The TX processing circuitry 322 receives analog or digital data (such as voice data, web data, e-mail, or interactive video game data) from the controller/processor 324. The TX processing circuitry 322 encodes, multiplexes, and/or digitizes the outgoing baseband data to generate processed baseband or IF signals. The RF transceivers 321a-321n receive the outgoing processed baseband or IF signals from the TX processing circuitry 322 and up-converts the baseband or IF signals to RF signals that are transmitted via the antennas 320a-320n.

The controller/processor 324 can include one or more processors or other processing devices that control the overall operation of the gNB 102. For example, the controller/processor 324 can control the reception of forward channel signals and the transmission of reverse channel signals by the RF transceivers 321a-321n, the RX processing circuitry 323, and the TX processing circuitry 322 in accordance with well-known principles. The controller/processor 324 can support additional functions as well, such as more advanced wireless communication functions. For instance, the controller/processor 324 can perform the blind interference sensing (BIS) process, such as performed by a BIS algorithm, and decodes the received signal subtracted by the interfering signals. Any of a wide variety of other functions can be supported in the gNB 102 by the controller/processor 324. In some embodiments, the controller/processor 324 includes at least one microprocessor or microcontroller.

The controller/processor 324 is also capable of executing programs and other processes resident in the memory 325, such as a basic OS. The controller/processor 324 is also capable of supporting channel quality measurement, positioning measurements and reporting for systems having 2D antenna arrays as described in embodiments of the present disclosure. In some embodiments, the controller/processor 324 supports communications between entities, such as web real time communications (RTC). The controller/processor 324 can move data into or out of the memory 325 as required by an executing process.

The controller/processor 324 is also coupled to the backhaul or network interface 326. The backhaul or network interface 326 allows the gNB 102 to communicate with other devices or systems over a backhaul connection or over a network. The interface 326 can support communications over any suitable wired or wireless connection(s). For example, when the gNB 102 is implemented as part of a cellular communication system (such as one supporting 5G, LTE, or LTE-A), the interface 326 can allow the gNB 102 to communicate with other gNBs over a wired or wireless backhaul connection. When the gNB 102 is implemented as an access point, the interface 326 can allow the gNB 102 to communicate over a wired or wireless local area network or over a wired or wireless connection to a larger network (such as the Internet). The interface 326 includes any suitable structure supporting communications over a wired or wireless connection, such as an Ethernet or RF transceiver.

The memory 325 is coupled to the controller/processor 324. Part of the memory 325 can include a random access memory (RAM), and another part of the memory 325 can include a Flash memory or other read only memory (ROM). In certain embodiments, a plurality of instructions, such as a BIS algorithm is stored in memory. The plurality of instructions is configured to cause the controller/processor 324 to perform the BIS process and to decode a received signal after subtracting out at least one interfering signal determined by the BIS algorithm.

As described in more detail below, the transmit and receive paths of the gNB 102 (implemented using the RF transceivers 321a-321n, TX processing circuitry 322, and/or RX processing circuitry 323) support communication with aggregation of FDD cells and TDD cells.

Although FIG. 3B illustrates one example of an gNB 102, various changes may be made to FIG. 3B. For example, the gNB 102 can include any number of each component shown in FIG. 3B. As a particular example, an access point can include a number of interfaces 382, and the controller/processor 378 can support routing functions to route data between different network addresses. As another particular example, while shown as including a single instance of TX processing circuitry 374 and a single instance of RX processing circuitry 376, the gNB 102 can include multiple instances of each (such as one per RF transceiver).

In the present disclosure, a unit for DL signaling, for UL signaling, or for SL signaling on a cell is referred to as a slot and can include one or more symbols. A bandwidth (BW) unit is referred to as a resource block (RB). One RB includes a number of sub-carriers (SCs). For example, a slot can have duration of one millisecond (ms) and an RB can have a bandwidth of 180 kilohertz (KHz) and include 12 SCs with inter-SC spacing of 15 KHz. A slot can be either a full DL slot, or full UL slot, or hybrid slot similar to a special subframe in time division duplex (TDD) systems (see also [1]). In addition, a slot can have symbols for SL communications.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also [1]). A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in its buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs. A CSI report from a UE can include a channel quality indicator (CQI) informing a gNB of a largest modulation and coding scheme (MCS) for the UE to detect a data TB with a predetermined block error rate (BLER), such as a 10% BLER (see also [3]), of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH, see also [3] and [4]).

SL signals and channels are transmitted and received on sub-channels within a resource pool, where a resource pool is a set of time-frequency resources used for SL transmission and reception within a SL BWP. SL channels include physical SL shared channels (PSSCHs) conveying data information, physical SL control channels (PSCCHs) conveying SL control information (SCI) for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. The SCI can be split into two parts/stages corresponding to two respective SCI formats; the first SCI format is multiplexed on a PSCCH, while the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information to a group of UEs within a (pre-)configured set. In a broadcast mode, a PSCCH/PSSCH conveys SL information to all surrounding UEs. In NR release 16, there are two resource allocation modes for a PSCCH/PSSCH transmission. In resource allocation mode 1, a gNB schedules UEs on the SL and conveys the scheduling information to a UE transmitting on the SL through a DCI format. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

As NR expands into new verticals, there is a need to provide improved location capabilities to meet various regulatory and commercial positioning requirements. 3GPP SA1 considered the service requirements for high accuracy positioning in TS 22.261 [7] and identified seven service levels for positioning, with varying levels of accuracy (horizontal accuracy and vertical accuracy), positioning availability, latency requirement, as well as positioning type (absolute or relative).

One of the positioning service levels is relative positioning (see table 7.3.2.2-1 of TS 22.261 [7]), with a horizontal and vertical accuracy of 0.2 m, availability of 99%, latency of 1 sec, and targeting indoor and outdoor environments with speed up to 30 kilometers/hour and distance between UEs or a UE and a 5G positioning node of 10 m.

The positioning solutions proposed for release 16 targeted the following commercial requirements for commercial applications in meters (m) and seconds (s):

| Requirement characteristic | Requirement target |
| --- | --- |
| Horizontal positioning error | Indoor: 3 m for 80% of the UEs<br>Outdoor: 10 m for 80% of the UEs |
| Vertical positioning error | Indoor: 3 m for 80% of the UEs<br>Outdoor: 3 m for 80% of the UEs |
| End to end latency | Less than 1 second |

To meet these requirements, radio access technology (RAT) dependent, RAT independent, and a combination of RAT dependent and RAT independent positioning schemes have been considered. For the RAT dependent positioning schemes, timing based positioning schemes as well as angle-based positioning schemes have been considered. For timing based positioning schemes, NR supports DL time difference of arrival (DL-TDOA), using positioning reference signals (PRS) for time of arrival measurements. NR also supports UL time difference of arrival (UL-TDOA), using sounding reference signals (SRS) for time arrival measurements.

NR also supports round-trip time (RTT) with one or more neighboring gNBs (including satellites) or transmission/reception points (TRPs). For angle based positioning schemes, NR exploits the beam-based air interface, supporting downlink angle of departures (DL-AoD), as well as uplink angle of arrival (UL-AoA). Furthermore, NR supports enhanced cell-ID (E-CID) based positioning schemes. RAT independent positioning schemes can be based on global navigation satellite systems (GNSS), WLAN (e.g., WiFi), Bluetooth, Terrestrial Beacon System (TBS), as well as sensors within the UE such as accelerometers, gyroscopes, magnetometers, etc. Some of the UE sensors are also known as Inertial Measurement Units (IMUs).

It should be noted that in general, the above schemes do not meet the positioning accuracy requirements identified by 3GPP SA1.

Component 1: Using Uplink Transmission for Determination of Relative Positioning FIG. 4 illustrates a timing diagram 400 in a cell for uplink transmission from a UE. A gNB transmits downlink channels and signals 401 that are aligned to a reference time 407 at the gNB. A reference time can be determined by a symbol, a slot, a subframe, and/or a frame where a downlink transmission can occur. As a downlink transmission propagates to a UE (e.g., UE1 or UE2), the downlink transmission is delayed by the propagation delay. A downlink transmission at UE1 402 can be delayed by a one-way propagation delay from a gNB to UE1. A one-way propagation delay between a gNB and UE1, can equal half a round-trip-time (RTT1) from a gNB to UE1 and back to the gNB. A downlink transmission can be synchronization signal or a synchronization signal block (SSB), or a downlink reference signal or channel that allows a UE to establish synchronization and a reference time 409 for that UE1.

For a second UE, UE2, a one-way propagation delay between a gNB and UE2, can equal half a round-trip-time (RTT2) from a gNB to UE2 and back to the gNB. A second UE, UE2, can establish a reference time 410 for that UE2. In FIG. 4, a first UE1 reference time 409 can be offset from a gNB reference time 407 by $RTT_1/2$. A second UE2 reference time 410 can be offset from a gNB reference time 407 by $RTT_2/2$. For an uplink transmission from the first UE1, the first UE can advance its transmission time by $T_{TA1}=(N_{TA1}+N_{TA,offset})\cdot T_c$, where $N_{TA1}$ is determined based on the round-trip-time, i.e., $RTT_1=N_{TA1}\cdot T_c \cdot N_{TA,offset}$ is provided by higher layers, is determined based on a default value (which may be zero), or may be configured to be zero. $T_c$ is a basic time unit and, for NR, $T_c$ is equal to 0.5086 nanoseconds (nsec). A time advance of a transmission from the first UE 404 is such that after a transmission from the first UE propagates to a gNB, a corresponding reception at the gNB is aligned to an uplink reference time at the gNB 408. The time difference between a downlink reference time 407 at the gNB and an uplink reference time 408 at the gNB is $N_{TA,offset}\cdot T_c$.

A transmission from a first UE, UE1, also propagates to a second UE, UE2, and a corresponding propagation time is $T_{12}$. In FIG. 4, $T_{12}$ is a propagation time for a transmission from the first UE to be received at the second UE 406.

A second UE can measure a time for arrival $T_{m21}$ of a transmission from a first UE (i.e., 406) relative to a reference time of the second UE (i.e., 410) as $$T_{m21} = \frac{RTT_1 + RTT_2}{2} + N_{TA,offset}\cdot T_c - T_{12}.$$

A second UE can:
Determine $RTT_2$ based on its own time advance command $N_{TA2}$.
Determine $RTT_1$ if provided by a network a time advance command $N_{TA1}$ for a first UE.
Determine $N_{TA,offset}$ by higher layer configuration or through a default value.

Hence, after measuring $T_{m21}$, the second UE can determine $T_{12}$.

A second UE can determine a one-way propagation distance, $d_{12}$, between a first UE and a second UE as $d_{12}=c\cdot T_{12}$, where c is the speed of light.

In a first example 1.1, an uplink signal or channel transmission from a first UE is received by a second UE through a line-of-sight channel and a one-way propagation distance $d_{12}$ is a distance between the first UE, UE1, and the second UE, UE2.

In a second example 1.2, a second UE can determine an angle of arrival of an uplink signal or channel transmission from a first UE relative to its axis. Based on an angle of arrival and a distance $d_{12}$ to the first UE, the second UE can determine a position of the first UE relative to its axis and its position. In the example of FIG. 5, the second UE can determine the angle of arrival of the uplink signal or channel from the first UE relative to its axis: (x, y and z). Hence, the second UE can determine the position of the first UE relative to the axis of the second UE.

In a further example 1.3, a second UE can determine an orientation of the second UE's axis. For example, such orientation can be determined using the IMU, or other methods available to the second UE, or an orientation of the second UE's axis is pre-configured or configured to the second UE. Based on the orientation of the second UE's axis, an angle of arrival at the second UE of an uplink signal or channel transmission from a first UE and a distance $d_{12}$ from the second UE to the first UE, the second UE can determine a position of the first UE relative to a position of the second UE. In the example of FIG. 5, if the orientation of axis of the second UE is determined, or pre-configured, or configured by higher layers relative to a global axis system, the second UE can determine the location of the first UE relative to the location of the second UE.

In a further example 1.4, a second UE can be pre-configured or configured with its position or can determine its position. Based on the position of the second UE, an orientation of the second UE's axis, an angle of arrival at the second UE of an uplink signal or channel transmission from a first UE, and a distance $d_{12}$ between the first UE and the second UE, the second UE can determine an absolute position of the first UE. In the example of FIG. 5, if the orientation of axis of the second UE is determined, or pre-configured, or configured by higher layers relative to a global axis system, and if a location of the second UE is determined, or pre-configured, or configured by higher layers, the second UE can determine an absolute location of the first UE.

Figure 6:
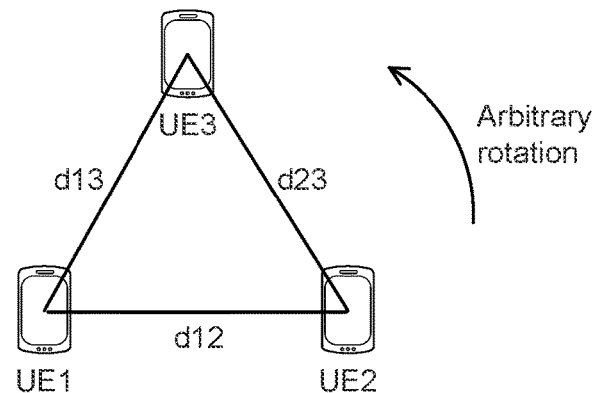
FIG. 6 illustrates three UEs in a two-dimensional plane.

In a further example 1.5, and further to example 1.1, within a plurality of UEs, a UE can determine distances between the UE and the other UEs from the plurality of UEs based on transmissions from the other UEs that are received by the UE. Within the plurality of UEs, relative distance information can be exchanged among UEs to determine relative position information. Within a plane (i.e., UEs are in a two-dimensional plane), as illustrated in FIG. 6, at least three UEs can be required to determine relative UE locations and there can be an arbitrary rotation to a position of a UE relative to another UE. Within a space (i.e., UEs are in a three-dimensional space), at least four UEs can be required to determine relative UE locations and there can be an arbitrary rotation to a position of a UE relative to another UE in azimuth and elevation In a further example 1.5.1, a plurality of UEs are in a two-dimensional plane and at least two UEs move along a predefined trajectory, such as in FIG. 6 where UE1 and UE2 can move along a horizontal line. If a distance $d_{13}$ between a third UE (UE3) and a first UE (UE1), and a distance $d_{23}$ between a third UE (UE3) and a second UE (UE2) are determined by the third UE, the third UE can also determine a relative position of the third UE relative to the first UE and a relative position of the third UE relative to the second UE.

In a further example 1.5.2, a plurality of UEs are in three-dimensional space and at least three UEs move along a predefined trajectory that is not linear. If a fourth UE (not shown) determines a distance $d_{14}$ between the fourth UE and a first UE, a distance $d_{24}$ between the fourth UE and a second UE, and a distance $d_{34}$ between the fourth UE and a third UE, the fourth UE can determine a relative position to the first UE, a relative position to the second UE, and a relative position to the third UE.

In a further example 1.6, a transmission from a first UE is a PUSCH and/or a PUCCH, and a second UE measures a time of arrival of the PUSCH and/or the PUCCH relative to a reference time of the second UE based on DMRS resource elements and/or symbols of a transmission from the first UE.

In a further example 1.6.1, a transmission from a first UE is a PUSCH that is scheduled by a DCI format.

In a further example 1.6.2, a second UE monitors PDCCH transmission to the first UE according to a search space set for first UE used for scheduling PUSCH transmissions from the first UE and, according to a DCI format scheduling a PUSCH transmission from the first UE, the second UE measures a time of arrival of the PUSCH transmission from the first UE relative to a reference time of the second UE and/or the second UE measures an angle of arrival of the PUSCH transmission from the first UE.

In a further example 1.6.3, a second UE is configured/informed of a resource allocation and configuration of a PUSCH transmission from a first UE. For example, a PDCCH reception by the second UE can provide a DCI format that schedules a PUSCH transmission from the first UE so that the second UE is also informed of the parameters for the PUSCH transmission from the first UE.

In a further example 1.6.4, a transmission from a first UE is a configured grant Type 1 PUSCH transmission.

In a further example 1.6.5, a second UE is configured/informed of a resource allocation and configuration of a configured grant Type 1 PUSCH transmission from a first UE.

In a further example 1.6.6, a second UE attempts to receive a configured grant Type 1 PUSCH transmission from a first UE and determines an existence of a transmission from the first UE for subsequent time of arrival measurements and/or angle of arrival measurements.

In a further example 1.6.7, a transmission from a first UE is a configured grant Type 2 PUSCH transmission.

In a further example 1.6.8, a second UE is configured/informed of a resource allocation and configuration of a configured grant Type 2 PUSCH transmission from a first UE, and the second UE monitors PDCCH according to search space sets for detection of a DCI format activating a configured grant Type 2 PUSCH transmission from the first UE and, according to the configured grant Type 2 transmission from the first UE, the second UE measures a time of arrival for the configured grant Type 2 PUSCH transmission from the first UE transmission relative to a reference time of the second UE and/or the second UE measures an angle of arrival of the configured grant Type 2 PUSCH transmission from the first UE.

In a further example 1.6.9, a second UE is configured/informed of a resource allocation and configuration of a configured grant Type 2 PUSCH transmission from a first UE, and a second UE is configured/informed of a configured grant Type 2 PUSCH from the first UE.

In a further example 1.7, a transmission from a first UE is an SRS or another signal such as for example a signal specifically designed signal for measuring time of arrival, and a second UE measures a time of arrival for the reference signal transmission from the first UE transmission relative to a reference time of the second UE and/or the second UE measures an angle of arrival of the reference signal transmission from the first UE.

In a further example 1.7.1, a network configures a first UE and a second UE with a SRS, or another signal, that can be used for measuring time of arrival at the second UE. The first UE can transmit the SRS or the reference signal, and the second UE can receive the SRS or the reference signal for time of arrival measurements and/or angle of arrival measurements.

In a further example 1.8, a transmission from a first UE is a PRACH.

In a further example 1.8.1, a network configures a first UE and a second UE a PRACH configuration. The first UE can transmit a PRACH and the second UE can receive the PRACH for time of arrival measurements and/or angle of arrival measurements.

In a further example 1.9, a transmission from a first UE for measurement of a time of arrival at a second UE is without any time advance relative to a reference time of the first UE. In this case, a time of arrival measurement at the second UE can be given by:

$$T_{m21} = \frac{RTT_2 - RTT_1}{2} - T_{12}.$$

In a further example 1.10, a duplexing scheme for uplink and downlink transmissions in a cell can be TDD. In this scenario, a carrier frequency for a downlink transmission, and a carrier frequency for an uplink transmission can be the same. Then, a same or similar RF circuitry can be used by the second UE to receive a transmission from a gNB or to receive of a transmission from the first UE for measurement by the second UE of a time of arrival and/or angle of arrival measurements for the transmission from the first UE.

In a further example 1.11, a duplexing scheme for uplink and downlink transmissions in a cell can be FDD. In this scenario, a carrier frequency for a downlink transmission, and a carrier frequency for an uplink transmission can be different. Then, a different RF circuitry can be used by a second UE to receive a transmission from a gNB and to receive a transmission from a first UE for a measurement by the second UE of a time of arrival and/or angle of arrival measurements for the transmission from the first UE.

In a further example 1.12, the downlink propagation delay, $T_{p\_dl}$, and the uplink propagation delay, $T_{p\_ul}$, between a gNB and a UE, are not equal. For a first UE, the round trip time can be related to the downlink propagation delay and to the uplink propagation delay by:

$RTT_1 = T_{p1\_dl} + T_{p1\_ul}.$

For a second UE, the round trip time can be related to the downlink propagation delay and to the uplink propagation delay by:

$RTT_2 = T_{p2\_dl} + T_{p2\_ul}.$

In a further example 1.12.1, a downlink propagation delay between a gNB and a UE includes the delay/latency of the transmit digital and/or analog (RF) circuitry of the gNB and/or the delay/latency of the receive digital and/or analog (RF) circuitry of the UE.

In a further example 1.12.2, an uplink propagation delay between a gNB and a UE includes the delay/latency of the transmit digital and/or analog (RF) circuitry of the UE and/or the delay/latency of the receive digital and/or analog (RF) circuitry of the gNB.

In a further example 1.12.3, a transmission from a first UE is advanced by $T_{TA1}$ relative to a reference time of the first UE. In this case, a time of arrival measurement, $T_{m21}$, at a second UE can be given by:

$T_{m21} = T_{p2\_dl} + T_{TA1} - T_{p1\_dl} - T_{12}.$

In a further example 1.12.4, a transmission from a first UE is not advanced relative to a reference time of the first UE. In this case, a time of arrival measurement, $T_{m21}$, at a second UE can be given by:

$T_{m21} = T_{p2\_dl} - T_{p1\_dl} - T_{12}.$

In a further example 1.12.5, a UE informs a gNB/network of the delay/latency of the receive and/or transmit digital and/or analog (RF) circuitry of the UE.

In a further example 1.12.6, a gNB informs a second UE of the delay/latency of the receive and/or transmit digital and/or analog (RF) circuitry of a first UE.

In a further example 1.13, a UE can be a road side unit (RSU).

Figure 7:
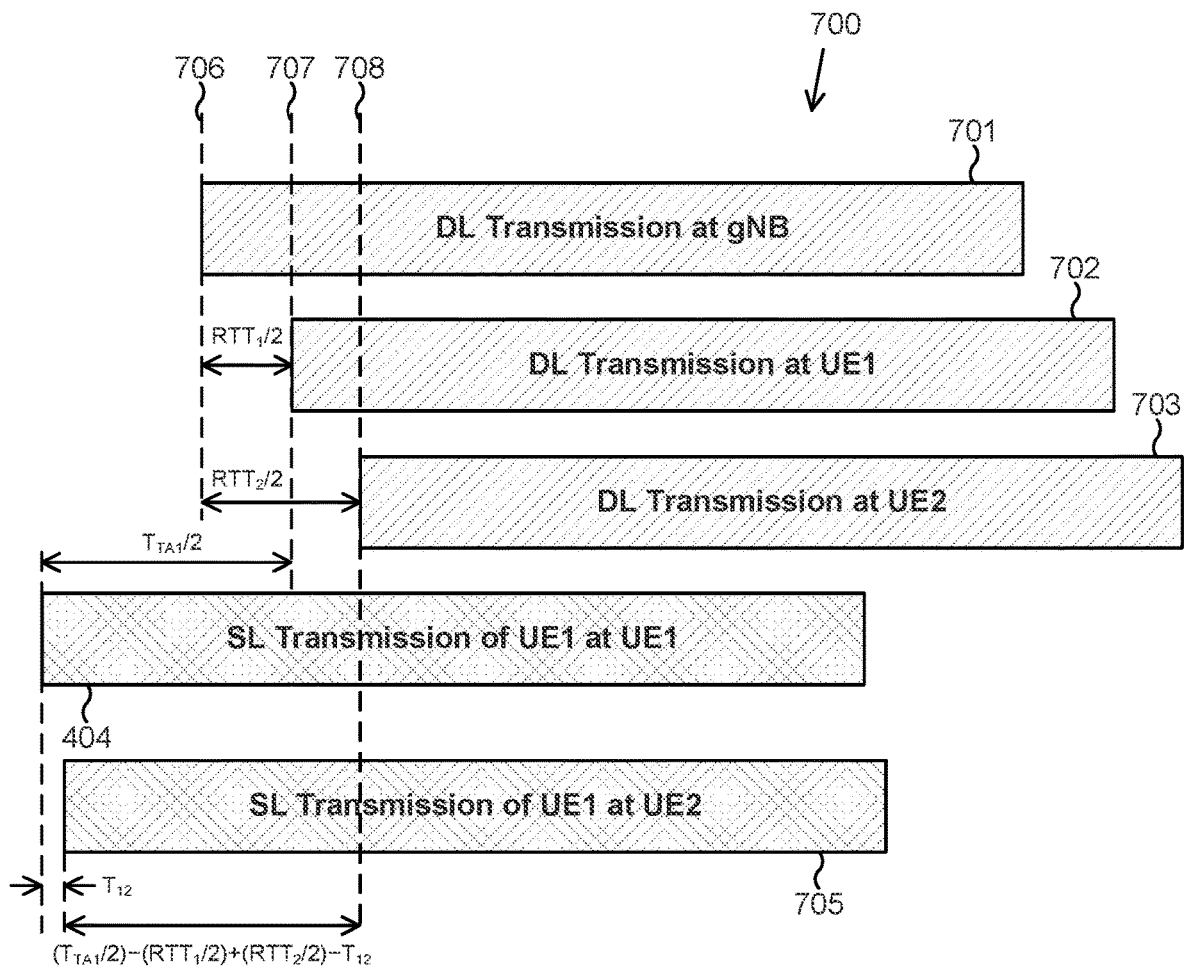
FIG. 7 illustrates a timing diagram in a cell for sidelink transmission from a UE according to an embodiment of this disclosure.

Component 2: Using Sidelink Transmission for Determination of Relative Positioning FIG. 7 illustrates a timing diagram in a cell for sidelink transmission from a UE. A gNB transmits downlink channels and signals 701 that are aligned to a reference time 706 at the gNB. A reference time can be determined by a symbol, a slot, a subframe, and/or a frame where a transmission for the gNB can occur. As a downlink transmission from the gNB propagates to a UE, such as UE1 or UE2, the transmission experiences a corresponding propagation delay. A reception at UE1 702 of a transmission from the gNB can be delayed by a one-way propagation delay from the gNB to UE1. A one-way propagation delay between the gNB and UE1, can be equal to half a round-trip-time (RTT1) from the gNB to UE1 and back to the gNB. A transmission from the gNB can be synchronization signal or a synchronization signal block (SSB), or a reference signal, or a channel that allows the UE to establish synchronization and a reference time 707 for that first UE. For a second UE, UE2, a one-way propagation delay between the gNB and UE2, can be equal to half a round-trip-time (RTT2) from the gNB to UE2 and back to the gNB. The second UE (UE2) can establish a reference time 708 for that second UE.

In FIG. 7, a reference time for a first UE1 707 can be offset from a reference time of a gNB 706 by $RTT_1/2$. A reference time for a second UE2 708 can be offset from a reference time of a gNB 706 by $RTT_2/2$.

For a sidelink transmission from a first UE, UE1, a second UE, UE2, can advance its transmission time by $T_{TA1}/2 = ((N_{TA1} + N_{TA,offset}) \cdot T_c)/2$, where $N_{TA1}$ is determined based on the round-trip-time, i.e., $RTT_1 = N_{TA1} \cdot T_c$, and $N_{TA,offset}$ is provided by higher layers, is determined by UE2 based on a default value (which may be zero), or may be configured to be zero. $T_c$ is a basic time unit that, for NR (for example) is equal to 0.5086 nsec. A time advance of a transmission from UE1 704 is half the propagation delay of a transmission from UE1. As a transmission from UE1 propagates to UE2, a time for UE2 to receive the transmission from UE1 is $T_{12}$. In FIG. 7, a reception at UE2 of a sidelink transmission from UE1 705 is depicted.

A second UE can measure a time of arrival $T_{m21}$ for a transmission from a first UE, such as 705, relative to a reference time of the second UE, such as 708, as:

$$T_{m21} = \frac{T_{TA1} + RTT_2 - RTT_1}{2} - T_{12}.$$

The second UE, can:
determine $RTT_2$ based on its own time advance command $N_{TA2}$,
determine $RTT_1$ if provided by a network a time advance command $N_{TA1}$ for the first UE,
determine $N_{TA,offset}$ by higher layer configuration or through a default value, and
determine $T_{TA1}$ based on $RTT_1$ and $N_{TA,offset}$.
Hence, after measuring $T_{m21}$, the second UE can determine $T_{12}$.

The second UE can determine a one-way propagation distance, $d_{12}$, between the first UE and the second UE as $d_{12} = c \cdot T_{12}$ where c is the speed of light.

In a first example 2.1, a sidelink signal or channel from a first UE propagates to a second UE through a line-of-sight channel, and a one-way propagation distance $d_{12}$ is a distance between the first UE, U1UE1, and the second UE, UE2.

In a second example 2.2, a second UE can determine an angle of arrival for a reception of a sidelink signal or channel transmission from a first UE relative to the axis of the second UE. Based on the angle of arrival and a distance $d_{12}$ to the first UE, the second UE can determine a position of the first UE relative to the axis and position of the second UE. In the example of FIG. 7, the second UE can determine the angle of arrival for a reception of a sidelink signal or channel transmission from the first UE relative to the axis (x, y and z) of the second UE. Hence, the second UE can determine the position of the first UE relative to the axis of the second UE.

In a further example 2.3, a second UE can determine an orientation of an axis of the second UE. For example, such orientation can be determined using the IMU, or other methods available to the second UE, or an orientation of the axis of the second UE is pre-configured or configured by higher layers to the second UE. Based on an orientation of the axis of the second UE, the second UE can determine an angle of arrival for a reception of a sidelink signal or channel transmission from a first UE and a distance $d_{12}$ from the first UE, and therefore the second UE can determine a position of the first UE relative to a position of the second UE. In the example of FIG. 7, if the orientation of axis of the second UE is determined, or pre-configured, or configured by higher layers relative to a global axis system, the second UE can determine a location of the first UE relative to a location of the second UE.

In a further example 2.4, a second UE can be pre-configured, or configured by higher layers, with its position or the second UE can determine its position. Based on the position of the second UE, the second UE can determine an orientation of the axis of the second UE, an angle of arrival for a reception of a sidelink signal or channel transmission from a first UE and a distance $d_{12}$ to the first UE. Then, the second UE can determine an absolute position of the first UE. In the example of FIG. 7, if the orientation of axis of the second UE, is determined, or pre-configured, or configured by higher layers relative to a global axis system, and if a location of the second UE is determined, or pre-configured, or configured by higher layers to the second UE, the second UE can determine an absolute location of the first UE.

In a further example 2.5, and further to example 2.1, within a plurality of UEs each UE can determine distances to other UEs from the plurality of UEs using receptions of sidelink transmissions from the other UEs. Within the plurality of UEs, relative distance information can be exchanged among UEs to determine relative position information among UEs from the plurality of UEs. Within a plane, when UEs are in a two-dimensional plane, as illustrated in FIG. 6, at least three UEs can be required to determine relative UE locations. In this case, there can be an arbitrary rotation to positions of UEs relative to another UE as illustrated in FIG. 6. Within space, when UEs are in a three-dimensional space, at least four UEs can be required to determine relative UE locations. In this case, there can be an arbitrary rotation to positions of UEs relative to another UE in azimuth and elevation.

In a further example 2.5.1, a plurality of UEs are in a two-dimensional plane and at least two UEs move along a predefined trajectory, such as in FIG. 6 where UE1 and UE2 can move along a horizontal line. If a third UE determines a distance $d_{13}$ between the third UE and a first UE, and a distance $d_{23}$ between the third UE and a second UE, the third UE can determine a relative position of the third UE relative to the first UE and a relative position of the third UE relative to the second UE.

In a further example 2.5.2, a plurality of UEs are in three-dimensional space and at least three UEs move along a predefined trajectory that is not linear. If a fourth UE determines a distance $d_{14}$ between the fourth UE and a first UE and a distance $d_{24}$ between the fourth UE and a second UE, and a distance $d_{34}$ between the fourth UE and a third UE, the fourth UE can determine a relative position of the fourth UE relative to the first UE, a relative position of the fourth UE relative to the second UE, and a relative position of the fourth UE relative to the third UE.

In a further example 2.6, a sidelink transmission from a first UE is a PSSCH or a PSCCH, and a second UE measures a time of arrival of a reception for the first UE transmission relative to a reference time of the second UE based on DMRS resource elements and/or symbols of the sidelink transmission from the first UE.

In a further example 2.6.1, a sidelink transmission from a first UE is to a third UE, while a second UE also monitors the sidelink transmission from the first UE to the third UE in order to measure a time of arrival for a reception of the sidelink transmission relative to a reference time of the second UE.

In a further example 2.6.2, a second UE monitors a PSCCH transmission from a first UE that provides a SCI format, such as a second stage SCI format, used for scheduling a PSSCH transmission from the first UE and, according to a reception of the PSSCH and of the PSCCH, the second UE measures a time of arrival for the transmissions from the first UE relative to a reference time of the second UE and/or the second UE measures an angle of arrival of the PSSCH and of the PSCCH transmission from the first UE.

In a further example 2.6.3, a second UE is configured/informed of a resource allocation and configuration of PSCCH/PSSCH transmissions from a first UE.

In a further example 2.6.4, a transmission from a first UE is a PSSCH that is scheduled by a DCI format.

In a further example 2.6.5, a transmission from a first UE is a PSSCH that is autonomously scheduled by a UE.

In a further example 2.6.6, a transmission from a first UE is a configured grant Type 1 PSSCH transmission.

In a further example 2.6.7, a second UE is configured/informed of a resource allocation and configuration of a configured grant Type 1 PSSCH transmission from a first UE.

In a further example 2.6.8, a second UE attempts to receive a configured grant Type 1 PSSCH transmission from a first UE and determines an existence of a transmission from the first UE for subsequent time of arrival measurements and/or angle of arrival measurements.

In a further example 2.6.9, a transmission from a first UE is a configured grant Type 2 PSSCH transmission resource.

In a further example 2.6.10, a second UE is configured/informed of a resource allocation and configuration of a configured grant Type 2 PSSCH transmission from a first UE, and the second UE monitors PDCCH according to search space sets for detection of a DCI format activating a configured grant Type 2 PSSCH transmission from the first UE and, according to the configured grant Type 2 transmission from the first UE, the second UE measures a time of arrival for the configured grant Type 2 PSSCH transmission from the first UE transmission relative to a reference time of the second UE and/or the second UE measures an angle of arrival of the configured grant Type 2 PSSCH transmission from the first UE.

In a further example 2.6.11, a second UE is configured/informed of a resource allocation and configuration of a configured grant Type 2 PSSCH transmission from a first UE, and a second UE is configured/informed of a configured grant Type 2 PSSCH from the first UE.

In a further example 2.6.12, a transmission from a first UE is a PSSCH that is scheduled by a DCI format. A second UE monitors PDCCH transmissions to the first UE according to a search space set for first UE used for scheduling sidelink transmissions from the first UE and, according to a DCI format scheduling a sidelink transmission from the first UE (PSCCH/PSSCH), the second UE measures a time of arrival of the PSCCH/PSSCH transmission from the first UE relative to a reference time of the second UE and/or the second UE measures an angle of arrival of the PSCCH/PSSCH transmission from the first UE.

In a further example 2.7, a sidelink transmission from a first UE is a reference signal that can be used for measuring time of arrival at a second UE, and the second UE measures a time of arrival of a reception for a transmission from the first UE relative to a reference time of the second UE based on the reference signal of the sidelink transmission from the first UE and/or the second UE measures an angle of arrival of the transmission from the first UE.

In a further example 2.7.1, a network pre-configures, or configures by higher layer signaling, a first UE to transmit and a second UE to receive a reference signal that can be used by the second UE for measuring a time of arrival and/or angle of arrival based on a reception of the reference signal transmission by the second UE.

In a further example 2.7.2, a third UE configures a first UE to transmit and a second UE to receive a reference signal that can be used by the second UE for measuring a time of arrival and/or angle of arrival based on a reception of the reference signal transmission by the second UE.

In a further example 2.8, a transmission from a first UE is a SL Synchronization Signal/PSBCH Block (S-SSB).

In a further example 2.9, a transmission from a first UE is a Physical Sidelink Feedback Channel (PSFCH).

In a further example 2.10, a first UE transmits a signal or channel for measurement of a time of arrival $T_{m21}$ at a second UE without any time advance relative to a reference time of the first UE. In this case, a time of arrival measurement $T_{m21}$ at a second UE can be determined as:

$$T_{m21} = \frac{RTT_2 - RTT_1}{2} - T_{12}.$$

In a further example 2.11, a UE can be a road side unit (RSU).

Although this disclosure has been described with an exemplary embodiment, various changes and modifications may be suggested to one skilled in the art. It is intended that this disclosure encompass such changes and modifications as fall within the scope of the appended claims.

What is claimed is:

1. A user equipment (UE), comprising:
a transceiver configured to receive one of a first uplink (UL) or sidelink (SL) signal from another UE; and
a processor operably coupled to the transceiver, the processor configured to determine:
a time of arrival for the first UL or SL signal relative to a reference time, wherein the reference time is based on the UE's synchronization to a base station,
a propagation time for the first UL or SL signal, and
a position of the other UE relative to the UE based on:
the time of arrival for the first UL or SL signal,
a first round trip time for transmissions between the base station and the other UE,
a second round trip time for transmissions between the base station and the UE, and
an angle of arrival of one (i) the first or a second UL signal or (ii) the first or a second SL signal from the UE, relative to a coordinate system of the UE,
wherein:
the transceiver is further configured to transmit the position of the other UE to the base station or a network element or a third UE or the other UE, and
the first round trip time and the second round trip time are received from the base station.

2. The UE of claim 1, wherein the processor is configured to determine the propagation time $T_p$ using:

$$T_p = \frac{RTT_1 + RTT_2}{2} + N_{TA,offset} \cdot T_c - T_{m21}$$

when the first UL or SL signal is a UL or SL signal and the other UE advances the UL or SL signal by $RTT_1$ and $N_{TA,offset}$ to compensate for round trip propagation delay, $$T_p = \frac{RTT_2 - RTT_1}{2} - T_{m21}$$

otherwise, when the first UL or SL signal is the UL or SL signal, and $$T_p = \frac{T_{TA1}}{2} + \frac{RTT_2 - RTT_1}{2} - T_{m21},$$

when the first UL or SL signal is the UL or SL signal and the other UE advances the UL or SL signal by $$\frac{T_{TA1}}{2},$$

and
wherein the processor is configured to determine a distance d using:

$d = cT_p,$ where:
$T_{m21}$ is the time of arrival for the first UL or SL signal relative to the reference time,
$RTT_1$ is the first round trip time,
$RTT_2$ is the second round trip time, and
$N_{TA,offset}$ or $$\frac{T_{TA1}}{2}$$

is an additional timing advance or a timing advance, respectively, for UL or SL transmissions, from the other UE relative to the reference time.

3. The UE of claim 1, wherein the processor is further configured to determine one of:
  a distance of the other UE relative to the UE,
  a position of the other UE relative to the UE in a coordinate system oriented on the UE,
  a position of the other UE relative to the UE in a global coordinate system, and
  a position of the other UE in the global coordinate system.

4. The UE of claim 1, wherein the UE is one of configured with or determines:
  a transmission instance and transmission parameters of the first UL or SL signal, or
  a transmission instance and transmission parameters of the second UL or SL signal.

5. The UE of claim 1, wherein the first UL or SL signal is a UL signal and the second UL or SL signal is a UL signal, and wherein one of the time of arrival of the first UL signal or the angle of arrival of the second UL signal is determined from one of:
  a transmission by the other UE on a physical uplink shared channel (PUSCH) or physical uplink control channel (PUCCH),
  a transmission by the other UE of a sounding reference signal (SRS), or
  a transmission by the other UE on a physical random access channel (PRACH).

6. The UE of claim 1, wherein the first UL or SL signal is an SL signal and the second UL or SL signal is an SL signal, and wherein one of the time of arrival for the first SL signal or the angle of arrival of the second SL signal is determined from one of:
  a transmission by the other UE on a physical sidelink shared channel (PSSCH) or physical sidelink control channel (PSCCH),
  a transmission by the other UE of a sidelink reference signal (RS),
  a transmission by the other UE of a sidelink synchronization signal/physical sidelink broadcast channel (PSBCH) block (S-SSB), or
  a transmission by the other UE on a physical sidelink feedback channel (PSFCH).

7. The UE according to claim 3, wherein the position of the other UE is determined by determining a distance between the other UE and a third UE, based on distances between the other UE, the UE, and the third UE.

8. The UE of claim 7, wherein the position of the other UE is determined by determining the distance between the other UE and a fourth UE, based on distances between the other UE, the UE, the third UE, and fourth UE.

9. A method, comprising:
  receiving, at a user equipment (UE), one of a first uplink (UL) or sidelink (SL) signal from another UE;
  determining:
    a time of arrival for the first UL or SL signal relative to a reference time, wherein the reference time is based on the UE's synchronization to a base station,
    a propagation time for the first UL or SL signal, and
    a position of the other UE relative to the UE based on:
      the time of arrival for the first UL or SL signal,
      a first round trip time for transmissions between the base station and the other UE,
      a second round trip time for transmissions between the base station and the UE, and
      an angle of arrival of one of (i) the first or a second UL signal or (ii) the first or a second SL signal from the UE, relative to a coordinate system of the UE; and
  transmitting the position of the other UE to the base station or a network element or a third UE or the other UE,
  wherein the first round trip time and the second round trip time are received from the base station.

10. The method of claim 9, wherein the propagation time $T_p$ is determined using:

$$T_p = \frac{RTT_1 + RTT_2}{2} + N_{TA,offset} \cdot T_c - T_{m21}$$

when the first UL or SL signal is a UL or SL signal and the other UE advances the UL or SL signal by $RTT_1$ and $N_{TA,offset}$ to compensate for round trip propagation delay, $$T_p = \frac{RTT_2 - RTT_1}{2} - T_{m21}$$

otherwise, when the first UL or SL signal is the UL or SL signal, and $$T_p = \frac{T_{TA1}}{2} + \frac{RTT_2 - RTT_1}{2} - T_{m21},$$

when the first UL or SL signal is the UL or SL signal and the other UE advances the UL or SL signal by $$\frac{T_{TA1}}{2},$$

and
  wherein the processor is configured to determine a distance d using:

$$d = cT_p,$$

where:
  $T_{m21}$ is the time of arrival for the first UL or SL signal relative to the reference time,
  $RTT_1$ is the first round trip time,
  $RTT_2$ is the second round trip time, and
  $N_{TA,offset}$ or $$\frac{T_{TA1}}{2}$$

is an additional timing advance or a timing advance, respectively, for UL or SL transmissions, from the other UE relative to the reference time.

11. The method of claim 9, wherein the UE is configured to determine one of:
  a distance of the other UE relative to the UE,
  a position of the other UE relative to the UE in a coordinate system oriented on the UE,
  a position of the other UE relative to the UE in a global coordinate system, and
  a position of the other UE in the global coordinate system.

12. The method of claim 9, wherein the UE is one of configured with or determines:
  a transmission instance and transmission parameters of the first UL or SL signal, or a transmission instance and transmission parameters of the second UL or SL signal.

13. The method of claim 9, wherein the first UL or SL signal is a UL signal and the second UL or SL signal is a UL signal, and wherein one of the time of arrival of the first UL signal or the angle of arrival of the second UL signal is determined from one of:
   a transmission by the other UE on a physical uplink shared channel (PUSCH) or physical uplink control channel (PUCCH),
   a transmission by the other UE of a sounding reference signal (SRS), or
   a transmission by the other UE on a physical random access channel (PRACH).

14. The method of claim 9, wherein the first UL or SL signal is an SL signal and the second UL or SL signal is an SL signal, and wherein one of the time of arrival for the first SL signal or the angle of arrival of the second SL signal is determined from one of:
   a transmission by the other UE on a physical sidelink shared channel (PSSCH) or physical sidelink control channel (PSCCH),
   a transmission by the other UE of a sidelink reference signal (RS),
   a transmission by the other UE of a sidelink synchronization signal/physical sidelink broadcast channel (PSBCH) block (S-SSB), or
   a transmission by the other UE on a physical sidelink feedback channel (PSFCH).

15. The method according to claim 11, wherein the position of the other UE is determined by determining a distance between the other UE and a third UE, based on distances between the other UE, the UE, and the third UE.

16. The method of claim 15, wherein the position of the other UE is determined by determining the distance between the other UE and a fourth UE, based on distances between the other UE, the UE, the third UE, and fourth UE.

17. A base station (BS), comprising:
   a processor configured to determine information comprising:
      a first round trip time for transmissions between the BS and a first user equipment (UE), and
      a second round trip time for transmissions between the BS and a second UE; and
   a transceiver coupled to the processor and configured to:
      transmit the information to the second UE, and
      receive, from the second UE, a position of the first UE determined by the second UE by determining:
         a time of arrival for one of a first uplink (UL) signal or a first sidelink (SL) signal from the first UE relative to a reference time, wherein the reference time is based on the UE's synchronization to a base station,
         a propagation time for the first UL or SL signal, and
         a position of the first UE relative to the second UE determined based on:
            the time of arrival for the first UL or SL signal,
            the first round trip time for transmissions between the base station and the first UE, and
            the second round trip time for transmissions between the base station and the second UE, and an angle of arrival relative to a coordinate system of the second UE of one of the first or a second UL signal or the first or a second SL signal from the first UE.

18. The BS of claim 17, wherein the propagation time $T_p$ is determined using one of:

$$T_p = \frac{RTT_1 + RTT_2}{2} + N_{TA,offset} \cdot T_c - T_{m21}$$

when the first UL or SL signal is a UL or SL signal and the second UE advances the UL or SL signal by $RTT_1$ and $N_{TA,offset}$ to compensate for round trip propagation delay, $$T_p = \frac{RTT_2 - RTT_1}{2} - T_{m21}$$

otherwise, when the first UL or SL signal is the UL or SL signal, and $$T_p = \frac{T_{TA1}}{2} + \frac{RTT_2 - RTT_1}{2} - T_{m21},$$

when the first UL or SL signal is the UL or SL signal and the second UE advances the UL or SL signal by $$\frac{T_{TA1}}{2},$$

and
   wherein a distance d is determined using:
      $d = cT_p$,
   where:
      $T_{m21}$ is the time of arrival for the first UL or SL signal relative to the reference time,
      $RTT_1$ is the first round trip time,
      $RTT_2$ is the second round trip time, and
      $N_{TA,offset}$ or $$\frac{T_{TA1}}{2}$$

is an additional timing advance or a timing advance, respectively, for UL or SL transmissions, from the second UE relative to the reference time.

19. The BS of claim 17, wherein a distance between the first and second UEs is determined based on a time of arrival at a second UE for the one of the UL signal or the SL signal, a first round trip time for transmissions between the BS and the first UE, and a second round trip time between the BS and the second UE, and a time advance or additional time advance of the UL or SL signal at the first UE, and
   wherein the one of the UL signal or the SL signal is one of:
      a transmission by the first UE on a physical uplink shared channel (PUSCH) or physical uplink control channel (PUCCH),
      a transmission by the first UE of a sounding reference signal (SRS),
      a transmission by the first UE on a physical random access channel (PRACH),
      a transmission by the first UE on a physical sidelink shared channel (PSSCH) or physical sidelink control channel (PSCCH),
      a transmission by the first UE of a sidelink reference signal (RS), a transmission by the first UE of a sidelink synchronization signal/physical sidelink broadcast channel (PSBCH) block (S-SSB), or a transmission by the first UE on a physical sidelink feedback channel (PSFCH).

20. The BS of claim 17, wherein the BS is provided:

from a second UE, a distance between the first UE and the second UE, from a third UE, a distance between the first UE and the third UE, from a fourth UE, a distance between the first UE and the fourth UE, wherein the BS is provided or determines:

a position of the second UE in a co-ordinate system, a position of the third UE in the co-ordinate system, and a position of the fourth UE in the co-ordinate system, and wherein the BS determines a position of the first UE in the co-ordinate system based on the distances provided.

* * * * *